United States Patent [19]

Miyazaki et al.

[11] Patent Number: 5,588,979
[45] Date of Patent: Dec. 31, 1996

[54] APPARATUS FOR CONTINUOUSLY FORMING AND PROCESSING A GLASS-CERAMIC

[75] Inventors: Mutsumi Miyazaki; Toshiaki Yoshida, both of Sagamihara, Japan

[73] Assignee: Kabushiki Kaisya Ohara, Kanagawa-Ken, Japan

[21] Appl. No.: 371,387

[22] Filed: Jan. 11, 1995

Related U.S. Application Data

[63] Continuation-in-part of Ser. No. 175,960, Dec. 30, 1993, abandoned.

[30] Foreign Application Priority Data

Nov. 8, 1993 [JP] Japan ..................... 5-278165

[51] Int. Cl.$^6$ ..................................... C03B 11/00
[52] U.S. Cl. .................. 65/164; 65/221; 65/225; 65/325; 65/326; 65/355
[58] Field of Search ..................... 65/164, 221, 225, 65/325, 326, 347, 355, 306, 339

[56] References Cited

U.S. PATENT DOCUMENTS

| | | | |
|---|---|---|---|
| 4,162,152 | 7/1979 | Petro | 65/164 |
| 4,244,723 | 1/1981 | Grossman . | |
| 4,336,303 | 6/1982 | Rittler . | |
| 4,369,053 | 1/1983 | Becker et al. . | |
| 4,402,724 | 9/1983 | Weisenburger et al. | 65/128 |
| 4,460,398 | 7/1984 | Sasaki | 65/327 |
| 4,682,998 | 7/1987 | Ayala-Ortiz . | |
| 4,708,729 | 11/1987 | Cardenas-Franco et al. . | |
| 4,769,059 | 9/1988 | Hidai et al. | 65/325 |
| 4,772,306 | 9/1988 | Davey et al. | 65/325 |
| 5,087,279 | 2/1992 | Monji et al. . | |
| 5,266,093 | 11/1993 | Konishi et al. | 65/158 |
| 5,433,765 | 7/1995 | Muniz et al. | 65/178 |

*Primary Examiner*—Long V. Le
*Attorney, Agent, or Firm*—Hedman, Gibson & Costigan, P.C.

[57] ABSTRACT

An apparatus for continuously forming a glass-ceramic which melts raw materials and forms melted glass to a predetermined shape without cutting the melted glass and thereafter continuously crystallizes the formed glass to the glass-ceramic is provided. The apparatus includes a melting device for melting raw materials, a flow tube for conveying the melted glass, a flow quantity control device connected to the flow tube for controlling the flow quantity of the melted glass, a pressing device for pressing the melted glass from the flow tube into a predetermined form, a glass preform checking device for measuring the weight or volume of the glass preform and feeding back a difference signal corresponding to a difference between the measured value of the weight or volume and a reference value to the flow quantity control device, the flow quantity control device controlling the quantity of the melted glass flowing through the flow tube in response to the difference signal to reduce the difference between the measured value and the reference value, and a crystallizing device for crystallizing the glass preform. The flow tube has an inner diameter which becomes smaller toward a melted glass outlet.

6 Claims, 9 Drawing Sheets

APPARATUS FOR CONTINUOUSLY FORMING AND PROCESSING A GLASS-CERAMIC

This application is a continuation-in-part of application Ser. No. 08/175,960, filed Dec. 30, 1993, which is now abandoned.

BACKGROUND OF THE INVENTION

This invention relates to an apparatus for continuously forming and processing a glass-ceramic from raw materials.

Glass-ceramics are superior in mechanical strength and resistivity to heat to ordinary glasses and hence have been increasingly used for various parts of electrical and electronic machines and instruments and precision machines including optical and magnetic disk substrates, heat resistant and anti-corrosive parts, electronic parts.

For manufacturing a glass-ceramic, it is necessary to add a nucleating ingredient in raw materials. For ensuring the effect of adding such nucleating ingredient, a pre-melting processing such as culleting is generally performed before melting the raw materials. Melted glass is formed into blocks and thereafter is subjected to a heat treatment for crystallization.

Figure 8:
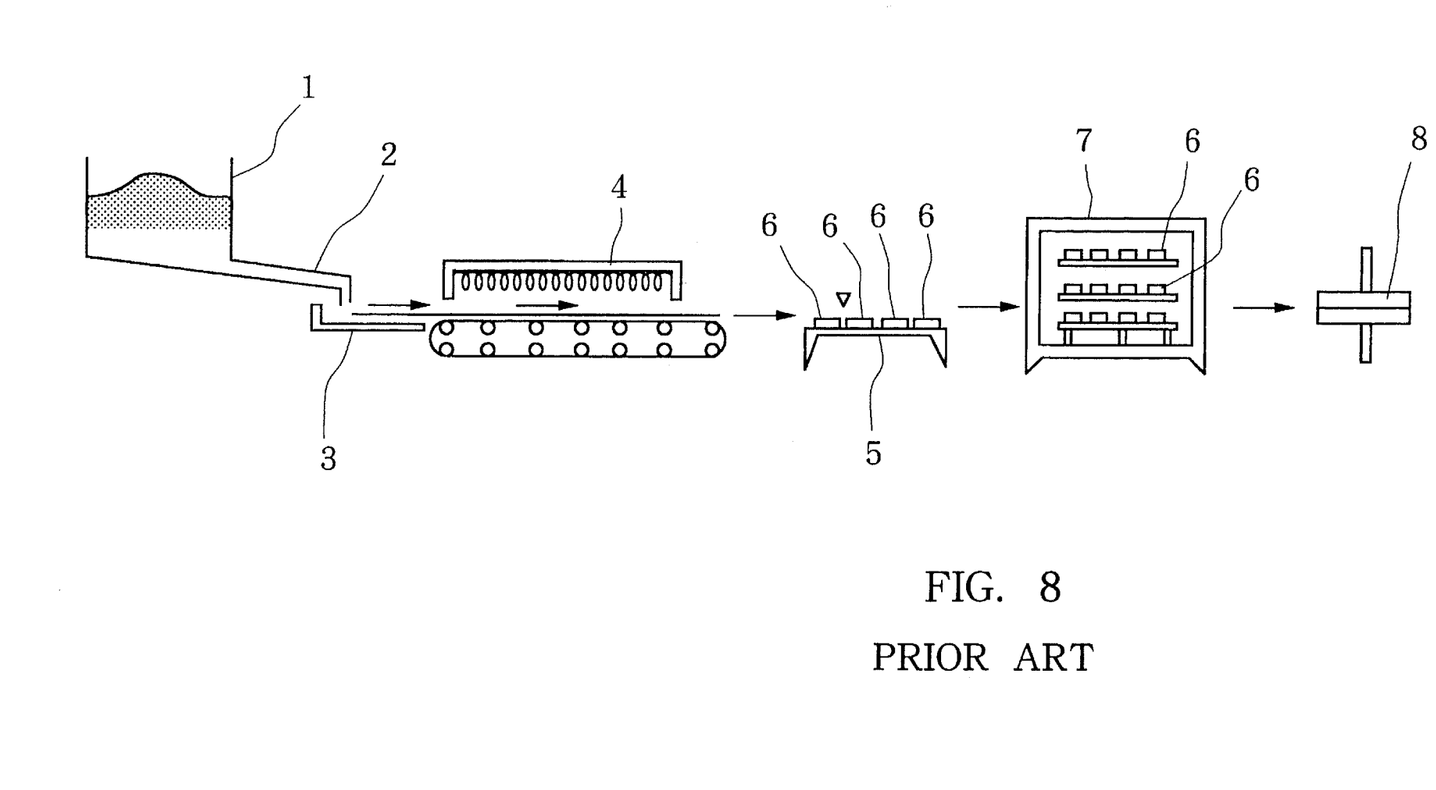
FIG. 8 is a diagram schematically showing an example of the prior art apparatus for manufacturing a glass-ceramic.
Figure 9:
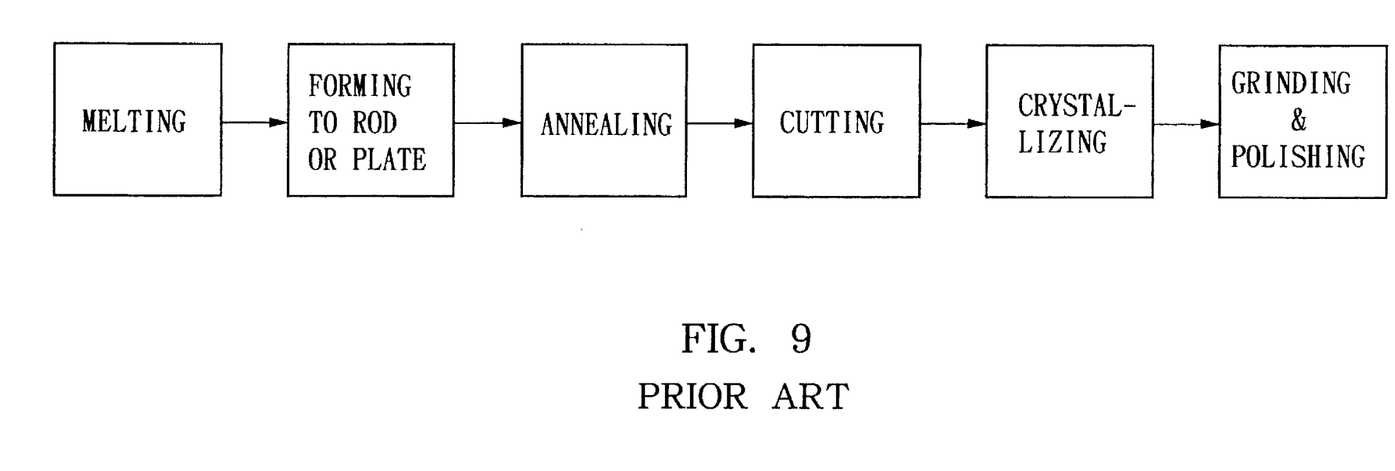
FIG. 9 is a diagram showing a process for manufacturing a glass-ceramic according to the prior art apparatus of FIG. 5.

FIGS. 8 and 9 show an example of a prior art process for manufacturing a glass-ceramic.

In these figures, glass materials which are melted in a melting apparatus 1 and reel ted glass is supplied to a glass forming mold 3 through a flow tube 2. The melted glass is formed by the mold 3 into a plate or a rod. The glass preform is then conveyed to an annealing kiln 4 where the glass preform is annealed to remove strain and homogenize the glass preform.

Then, the annealed glass preform is conveyed to a cutting device 5 where the glass preform is cut into blocks 6. Since a burr is produced at end pot t ions of the blocks 6 as a result of cutting, the end portions of each block 6 are ground to remove the burr.

Thereafter, the blocks 6 are conveyed to a single furnace 7 where crystallization of the glass preform is performed. The blocks 6 which have completed the crystallizing process are conveyed to a subsequent processing device 8 where the thickness of the blocks 6 are adjusted by grinding and the blocks 6 are subjected to surface polishing to provide finished products.

In the above described prior art process for manufacturing a glass-ceramic, most processings are performed independently from one another. That is, the annealed glass preform is conveyed to the cutting device 5 which is located in a separate location from the annealing kiln 4 and the blocks 6 obtained by cutting the formed glass are conveyed to the single furnace 7 which is located in a separate location from the cutting device 6. It is therefore difficult in the prior art process to automatize the process for manufacturing a glass-ceramic to realize a large scale production. Besides, sufficient stability in the quality of the finished products is not guaranteed in the prior art process.

Furthermore, the cutting process by the cutting device 5 is made in such a manner that a block produced by cutting has a larger size than a final finished glass-ceramic product and, therefore, the process after crystallization for processing the crystallized block 6 to the final finished product requires a considerable labor and time which results in a high manufacturing cost.

It is, therefore, an object of the invention to provide an apparatus for continuously forming and processing a glass-ceramic which is capable of directly forming a melted glass into a glass preform of a predetermined form which is ready for the crystallizing process and performing the subsequent crystallizing process continuously.

SUMMARY OF THE INVENTION

An apparatus for continuously forming and processing a glass-ceramic achieving the above described object of the invention comprises melting means for melting raw materials for a glass-ceramic into a melted glass, a flow tube for conveying the melted glass flowing out of the melting means, said flow tube having a melted glass inlet and a melted glass outlet and having an inner diameter which becomes smaller toward the melted glass outlet, flow quantity control means connected to the flow tube for controlling the flow quantity of the melted glass flowing through the flow tube, press means provided in a posterior stage to the flow tube for pressing the melted glass from the flow tube into a predetermined form, a glass preform checking means for measuring the weight or volume of a formed glass provided by the pressing means and for feeding back a difference signal corresponding to a difference between the measured value of the weight or volume and a reference value of the weight or volume to the flow quantity control means, said flow quantity control means controlling the quantity of the melted glass flowing through the flow tube in response to the difference signal to reduce the difference between the measured value and the reference value, and crystallizing means provided in a posterior stage to the glass preform checking means for crystallizing the glass preform.

According to the invention, raw materials of the glass are melted by the melting means and a predetermined amount of melted glass is introduced to the press means though the flow tube under the control of the flow quantity control means. The glass preform provided by the press means is measured in its weight or volume by the formed glass checking means and thereafter is supplied to the crystallizing means for crystallization.

Thus, according to the invention, the melting means, flow quantity control means, press means, formed glass checking means and crystallizing means are connected in series and, therefore, all process from melting of raw materials to crystallizing of the formed glass can be automatically carried out whereby a glass-ceramic can be produced automatically in a large scale and, moreover, the quality of the product can be stabilized and the process management can be facilitated.

It is an important feature of the invention that the flow tube has an inner diameter which becomes smaller toward the melted glass outlet. The inner diameter may become stepwisely smaller or, alternatively, may become continuously smaller.

By adopting this unique structure of the flow tube, the flow quantity control by the flow quantity control means can be made accurately and quickly while a relatively large flow quantity per unit time can be obtained as necessity arises.

Furthermore, according to the invention, the weight or volume of the glass preform formed by the press means is measured and a difference signal corresponding to a difference between the measured value and the reference weight or volume value is fed back to the flow quantity control means to correct the amount of the melted glass introduced to the press means. Accordingly, the formed glass provided by the press means can be directly crystallized by the crystallizing means and an only process required after annealing of the glass-ceramic is polishing as a finishing process. Thus, the cutting process which was indispensable in the prior art process is obviated and the tremendous labor and time required in the prior art process for reducing the thickness of the glass-ceramic after crystallization also are obviated and, therefore, the manufacturing cost of the glass-ceramic can be greatly reduced.

In one aspect of the invention, the apparatus further comprises a temperature maintaining means provided over a zone between the pressing means and the crystallizing means including the glass preform checking means for maintaining the temperature of the formed glass within a predetermined range of temperature. The predetermined range of temperature is set in the vicinity of a glass transition temperature.

According to this aspect of the invention, since the temperature maintaining means is provided between the press means and the crystallizing means, the temperature of the glass preform provided by the press means can be readily maintained at a temperature in the vicinity of the glass transition temperature. This prevents generation of strain in the glass preform when the glass preform is transferred from the press means to the crystallizing means and, accordingly, provision of an annealing process which was indispensable in the prior art process can be omitted whereby the manufacturing process can be simplified and the manufacturing cost can be reduced.

The crystallizing means comprises a first temperature raising zone for raising the temperature of the formed glass to a nucleating temperature, a nucleating zone provided in a posterior stage to the first temperature raising zone for maintaining the temperature of the formed glass at the nucleating temperature, a second temperature raising zone provided in a posterior stage to the nucleating zone for raising the temperature of the formed glass to a crystal growing temperature, a crystal growing zone provided in a posterior stage to the second temperature raising zone for maintaining the temperature of the glass preform at the crystal growing temperature, and an annealing zone provided in a posterior stage to the crystal growing zone for annealing the glass preform to remove a strain therefrom.

The flow quantity control means comprises means for variably heating the flow tube means in response to the difference signal to control viscosity of the melted glass and thereby to control the flow quantity of the melted glass.

According to this aspect of the invention, since the crystallizing means comprises five zones of the first temperature raising zone, nucleating zone, second temperature raising zone, crystal growing zone and annealing zone, the thermal processing cycle requried for crystallizing the formed glass can be easily realized whereby crystallizing of the glass preform can be carried out automatically and accurately.

Other objects and features of the invention will become apparent from the description made below with reference to the accompanying drawings.

BRIEF DESCRIPTION OF THE DRAWINGS

In the accompanying drawings.

DESCRIPTION OF A PREFERRED EMBODIMENT

Figure 1:
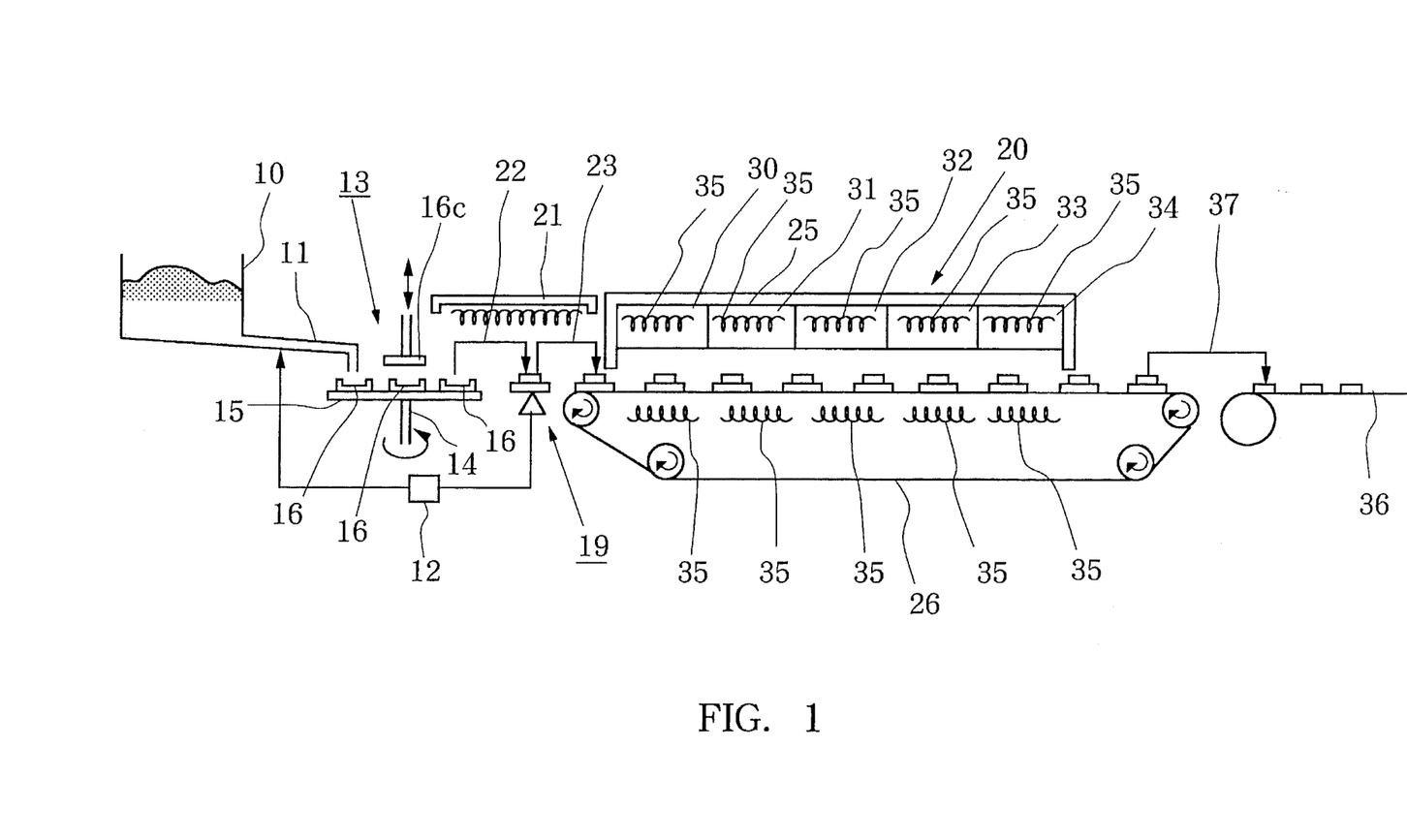
FIG. 1 is a diagram schematically showing an embodiment of the continuous forming and processing apparatus according to the invention.
Figure 2:
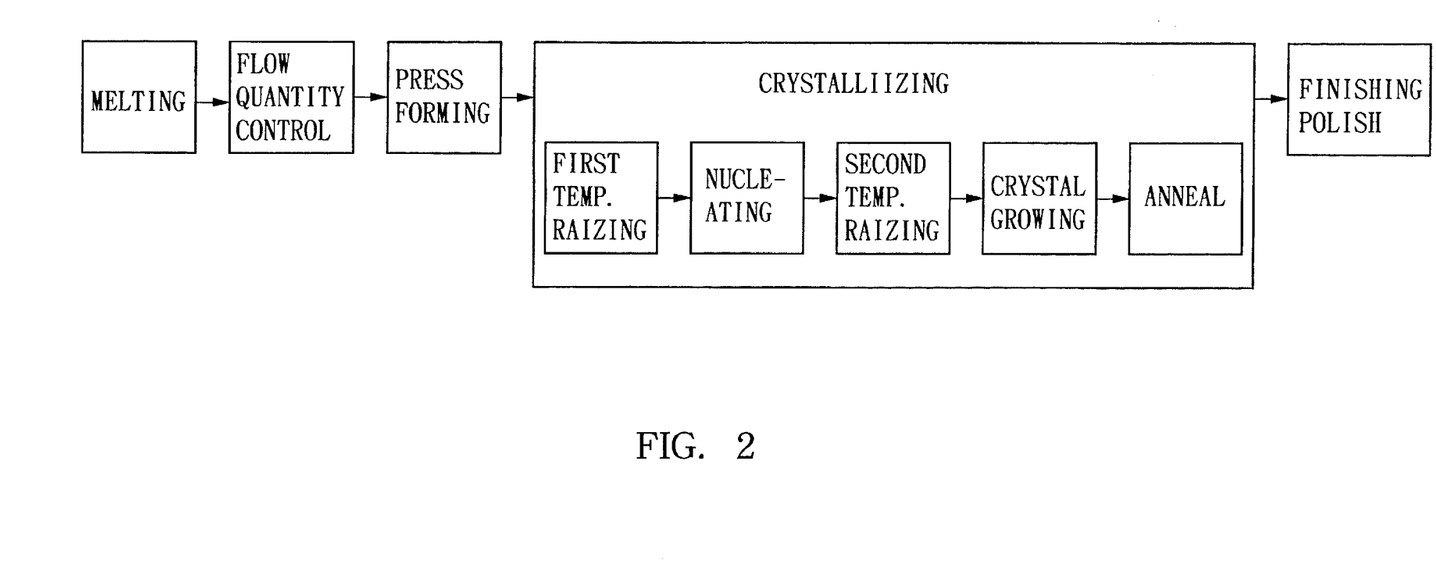
FIG. 2 is a diagram showing a process for manufacturing a glass-ceramic according to the apparatus of FIG. 1.
Figure 5:
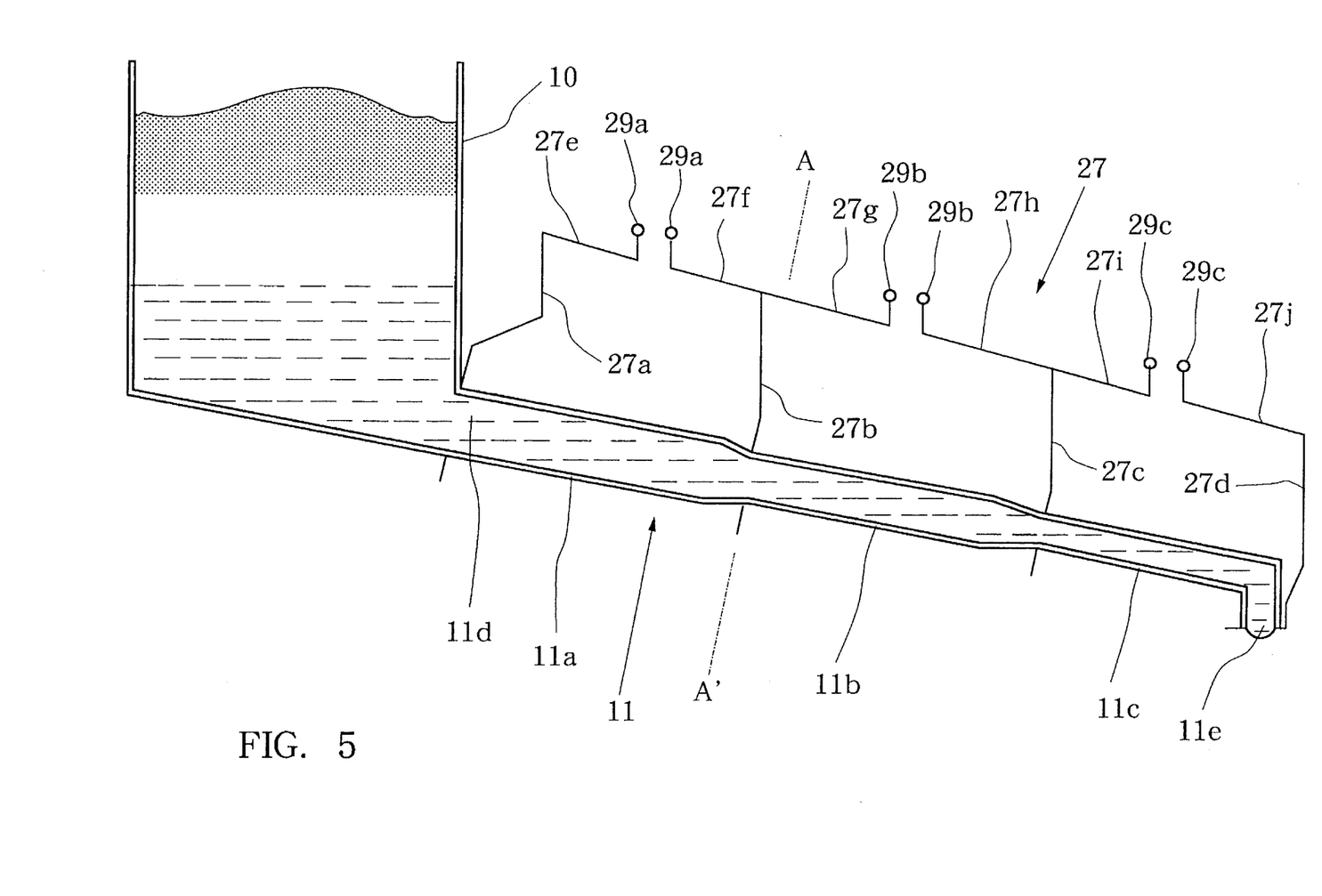
FIG. 5 is a sectional view showing an example of a flow tube 11 of FIG. 1.
Figure 6:
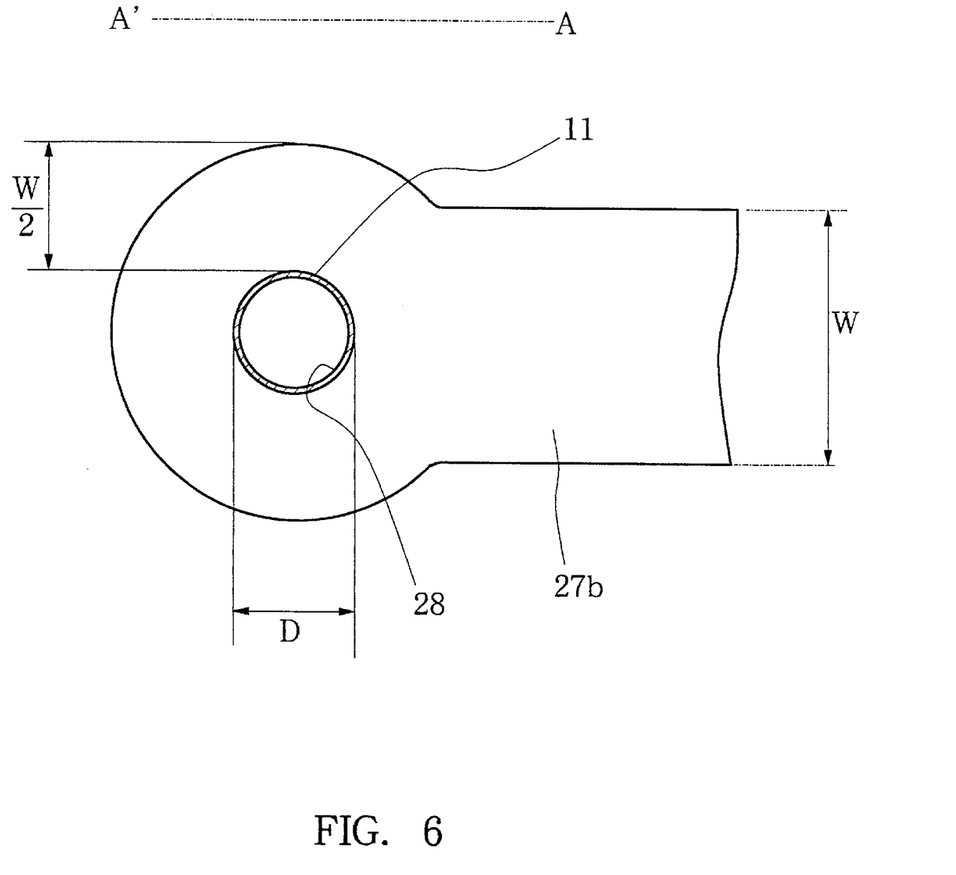
FIG. 6 is a view taken along line A—A' in FIG. 5.

Referring to FIG. 1, a melting apparatus 10 melts raw materials for the glass-ceramic. As the melting apparatus 10, an intermittent type furnace having functions of melting raw materials and refining and homogenizing melted glass or a connected type furnace made by connecting units respectively performing these functions may be used. To this melting apparatus 10 is connected, at the lower portion of the melting apparatus 10, a flow tube 11 for causing the melted glass to flow from the melting apparatus 10. In this embodiment, the flow tube 11 is an elongated tube arranged in an inclined posture with respect to a horizontal plane and is made of platinum or a platinum alloy which has a melted glass inlet 11d and a melted glass outlet 11e and consists of plural sections, e.g., three sections 11a, 11b and 11c as shown in FIG. 5. The respective sections 11a, 11b and 11c of the flow tube 11 have stepwisely reducing diameters such as 25 mm in the section 11a nearest to the melting apparatus 10, 18 mm in the middle section 11b and 10 mm in the thinnest section 11c which is nearest to the melted glass outlet 11e. The flow tube 11 is heated by conducting electric current therethrough from terminals 29a, 29b and 29c via lead plates 27 which consists of vertical lead plates 27a to 27d and top lead plates 27e to 27j. As shown in FIG. 6, the vertical lead plates 27a to 27d are formed with openings 28 in which the flow tube 11 in the corresponding sections fits and welded in the peripheral portions of these openings 28 to the outer peripheral portions of the flow tube 11. The melted glass outlet 11e is bent downwardly and the vertical lead plate 27d is bent horizontally at its lower portion and welded to the peripheral portion of the outlet 11e. There are provided plural electrical circuits, e.g., three in the above example of the flow tube, each allotted to one of the sections 11a, 11b and 11c of the flow tube 11 to heat the allotted section individually and independently and thereby control the viscosity of the melted glass and hence the flow quantity of the melted glass.

Referring to FIG. 6, it has been found that, when the width W of the lead plate 27b is a value within a range between 0.6 πD to 0.8 πD, most preferably 0.7 πD, where D represents the outer diameter of the flow tube 11, provided that the lead plate 27b has the same thickness as the flow tube 11, the most satisfactory flow quantity control can be achieved.

The temperature of the three sections 11a, 11b and 11c of the flow tube 11 is controlled in such a manner that the temperature of the melted glass in the section 11a is the highest and the temperature of the melted glass in the section 11b is lower than this temperature but is higher than the press temperature and the temperature of the melted glass in the section 11c becomes the press temperature, so that the temperature of the melted glass gradually drops from the temperature in the melting apparatus 10 to the press temperature. The amount of platinum used for the respective sections 11a, 11b and 11c differs from one another and hence the value of electric resistance differs from one another among the sections 11a, 11b and 11c whereby electric power supplied to these sections 11a, 11b and 11c differs from one another to maintain different temperatures in these sections 11b and 11c.

The control of the flow quantity of the melted glass is normally, and most preferably, made by the electrical circuit for the thinnest section 11c of the flow tube 11, though the control may be made through other electrical circuit or by the electrical circuit for the thinnest section 11c in combinabtion with other circuit or circuits.

Reason for adopting the unique structure of the flow tube 11, namely the flow tube having an inner diameter which becomes stepwisely smaller will now be described. Since variation of weight of glass preform provided by the press means is only 2% or 3% of a reference weight at the largest, if the flow tube 11 had the inner diameter of the section 11a, i.e., the thickest section, over the entire length of the flow tube 11, it would cause difficulty in the control of the flow quantity because, in this case, a slight change in the magnitude of electric current would cause flow of a large quantity of melted glass and would often result in excessive change in the flow quantity, for the flow quantity is proportional to the square of the inner diameter of the flow tube 11. Therefore, by adopting a flow tube of a small inner diameter, and changing the electric current supplied thereto, a minute change in the flow quantity of the melted glass can be easily achieved. If, however, such flow tube of a small inner diameter over the entire range of the flow tube was employed, resistance to the flow of the melted glass in the flow tube would increase and this would cause difficulty in achieving a large flow quantity when such large flow quantity is required. By adopting the flow tube 11 of the stepwisely reducing inner diameter, a fine flow quantity control can be accurately and quickly made by changing the temperature of the thinnest section 11c, whereas when it becomes necessary to increase the flow quantity by a large degree, such large flow quantity can be readily achieved by increasing the temperature of the entire sections 11a, 11b and 11c because there is no substantial increase in resistance to the flow of the melted glass in the sections 11a and 11b which will make it difficult to obtain such a large flow quantity.

A PID regulator 12 which constitutes the flow quantity control means provides proper electric currents to the sections 11a, 11b and 11c. When deviation exceeding a predetermined value from a reference value in the weight has occurred, the PID regulator 12 supplies a signal corresponding to difference of measured weight of pressed glass from a predetermined reference weight to the section 11c through the electric circuit. Thus, the PID regulator 12 performs the function of variably heating the flow tube in response to the difference signal to control viscosity of the melted glass and thereby control the flow quantity of the melted glass.

Figure 7:
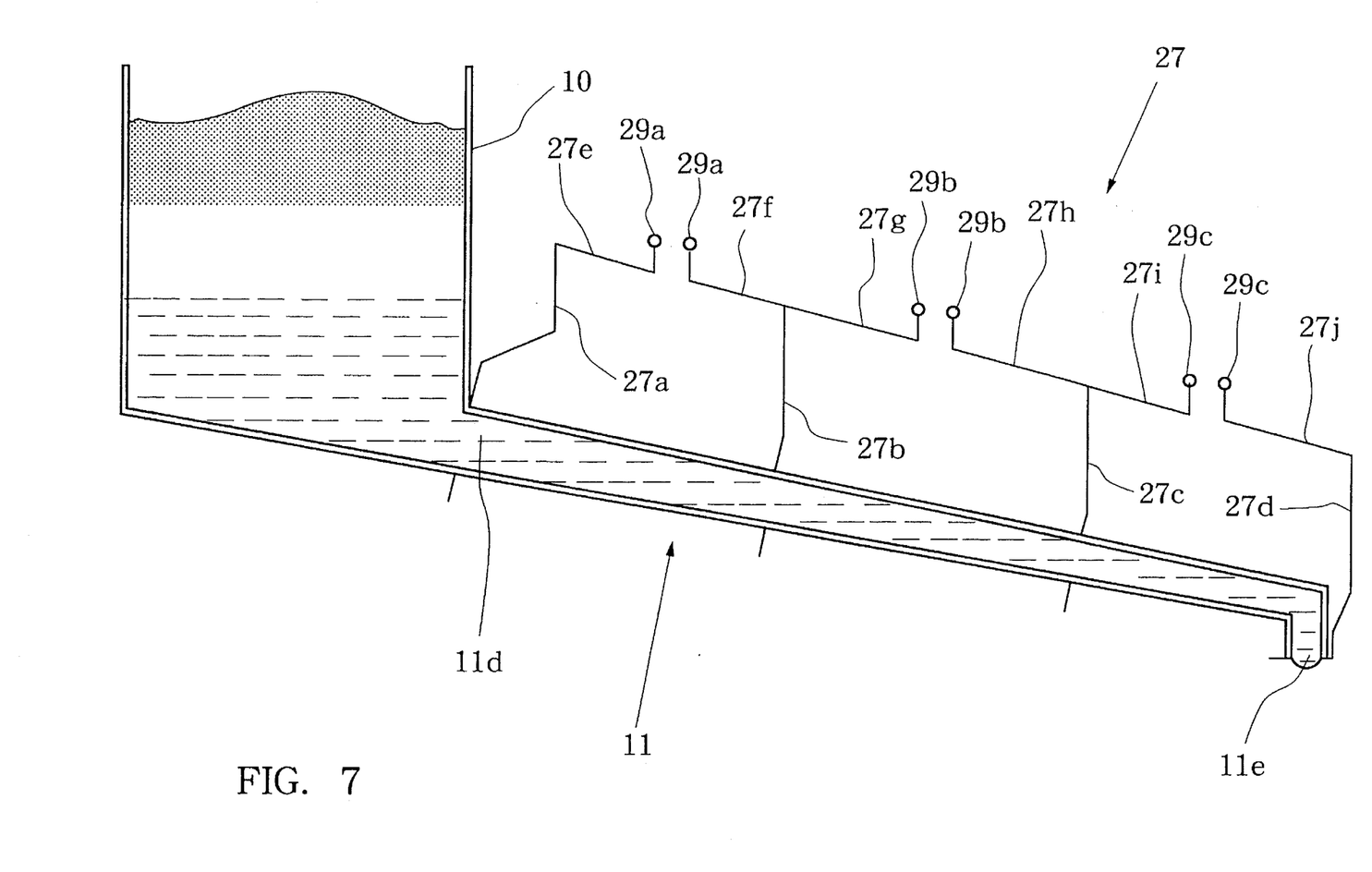
FIG. 7 is a sectional view showing another example of the flow tube of FIG. 1.

FIG. 7 shows another example of the flow tube 11 of FIG. 1. This example is the same as the flow tube 11 of FIG. 5 except that the flow tube 11 has an inner diameter which becomes continuously smaller toward the melted glass outlet 11e instead of a stepwisely reducing diameter.

Figure 3A:
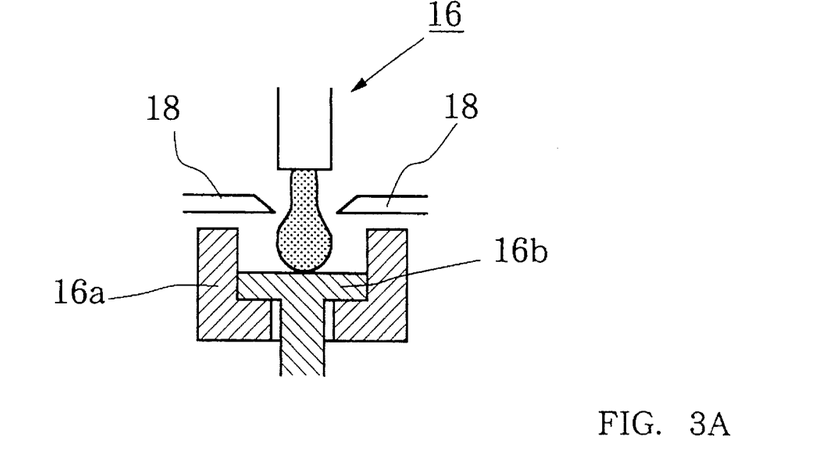
FIGS. 3A, 3B and 3C are diagrams showing an example of a mold used in the press device of the apparatus of the embodiment of FIG. 1.
Figure 3B:
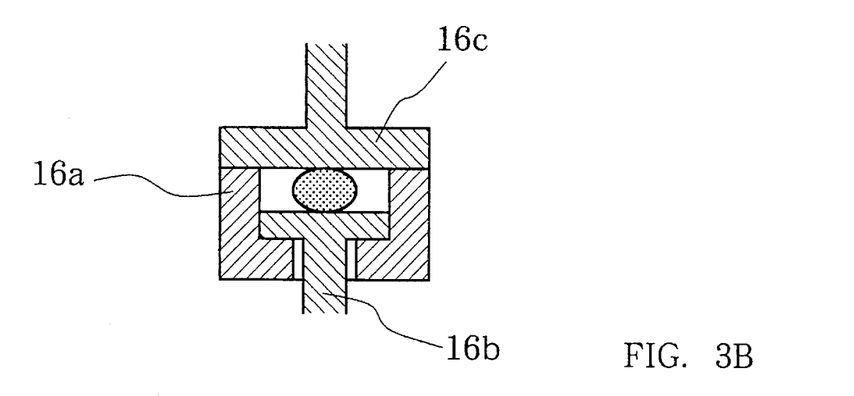
Figure 3C:
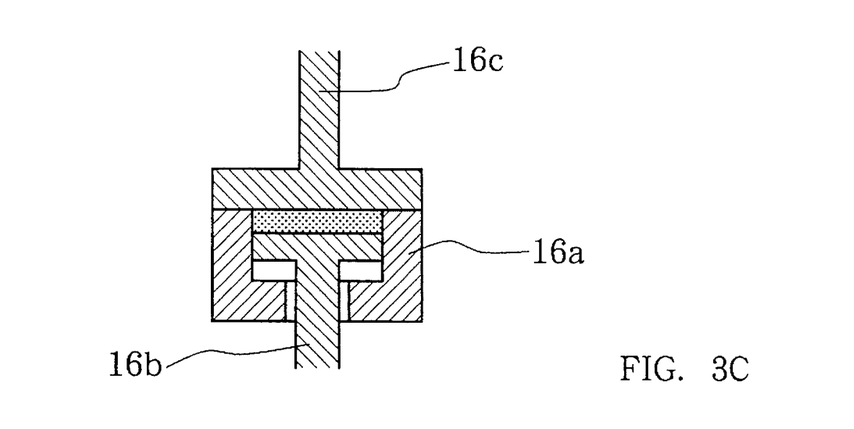

To the posterior stage of the flow tube 11 is provided a pressing device 13 which presses the melted glass provided from the flow tube 11 to a predetermined shape. This pressing device 13 includes a disk 15 which is rotated about a rotating shaft 14, forming molds 16 arranged on the upper surface of the disk 15 in the circumferential direction of the disk 15 at a predetermined angular interval and a press (not shown) provided above the forming molds 16. The forming molds 16 include, as shown in FIGS. 3A to 3C, a cylindrical mold 16a, lower die 16b which is vertically movably provided in the cylindrical die and an upper die 16c attached to the press at a position which is vertically opposite to the lower die. The melted glass from the flow tube 11 is introduced into the cylindrical mold 16a by a predetermined amount and, as shown in FIG. 3B, the upper die 16c is lowered to abut to the upper peripheral surface of the cylindrical mold 16a and, thereafter, as shown in FIG. 3C, the lower die 16b is raised to press the melted glass between the upper and lower dies 16e and 16b within the cylindrical mold 16a and thereby impart a predetermined shape to the melted glass.

The temperature of the mold 16 is set in the vicinity of a glass transition point and the temperature of the glass preform from the pressing device 13 is maintained within a range from the glass transition point to a temperature which is 50° C. below the glass transition point. In the vicinity of the tip portion of the flow tube 11, there is provided a pair of cutting blades 18 which cut the melted glass at each predetermined time interval.

In the posterior stage of the pressing device 13, there is provided a glass preform checking device 19. This glass preform checking device 19 measures the weight or volume of the glass preform which has been formed by the pressing device 13 and feeds back a signal corresponding to a difference between the measured weight or volume and a predetermined reference weight or volume to the PID regulator 12. In this embodiment, the glass preform checking device 19 measures the weight of the glass preform. The difference can be detected by measuring the weight of the glass preform by means, for example, of an electronic scale and comparing the measured weight with the reference weight. In the case where a difference in the volume of the glass preform is to be detected, the thickness of the glass preform is measured by a laser device or the like measuring means and the difference in the volume can be measured from the result of measurement of the thickness. This is because the mold 16 is composed of the cylindrical mold 16a and the upper and lower dies 16c and 16b and, therefore, the diameter of the glass preform is constant and the variation in the glass preform is produced in the thickness of the glass preform only so that the change in the volume can be detected by measuring the thickness of the glass preform. The difference in glass preform from the reference value should, for example, be within 50 mg in weight and 10 μm in volume.

In the posterior stage of the glass preform checking device 19, there is provided a crystallizing device 20 for crystallizing the glass preform. There is provided a temperature maintaining zone 21 between the pressing device 13 and the crystallizing device 20. This temperature maintaining zone 21 is provided for maintaining the temperature of the glass preform within a temperature range in the vicinity of the glass transition point. The temperature maintaining zone 21 includes a conveying system 22 for automatically conveying the glass preform from the pressing device 13 to the glass preform checking device 19 and a conveying system 23 for automatically conveying the glass preform from the glass preform checking device 19 to the crystallizing device 20.

The crystallizing device 20 includes a heating oven 25 and a conveying system 26 for conveying the glass preform continuously in the heating oven 25 without stopping. As the conveying system 26, a layer or caterpillar system is employed.

The heating oven 25 is made by serially connecting five independent muffle type ovens each having a different function in the direction of the conveying direction of the glass preform. The heating oven 25 is divided in five zones, namely, a first temperature raising zone 30, a nucleating zone 31, a second temperature raising zone 32, a crystal growing zone 33 and an annealing zone 34.

Figure 4:
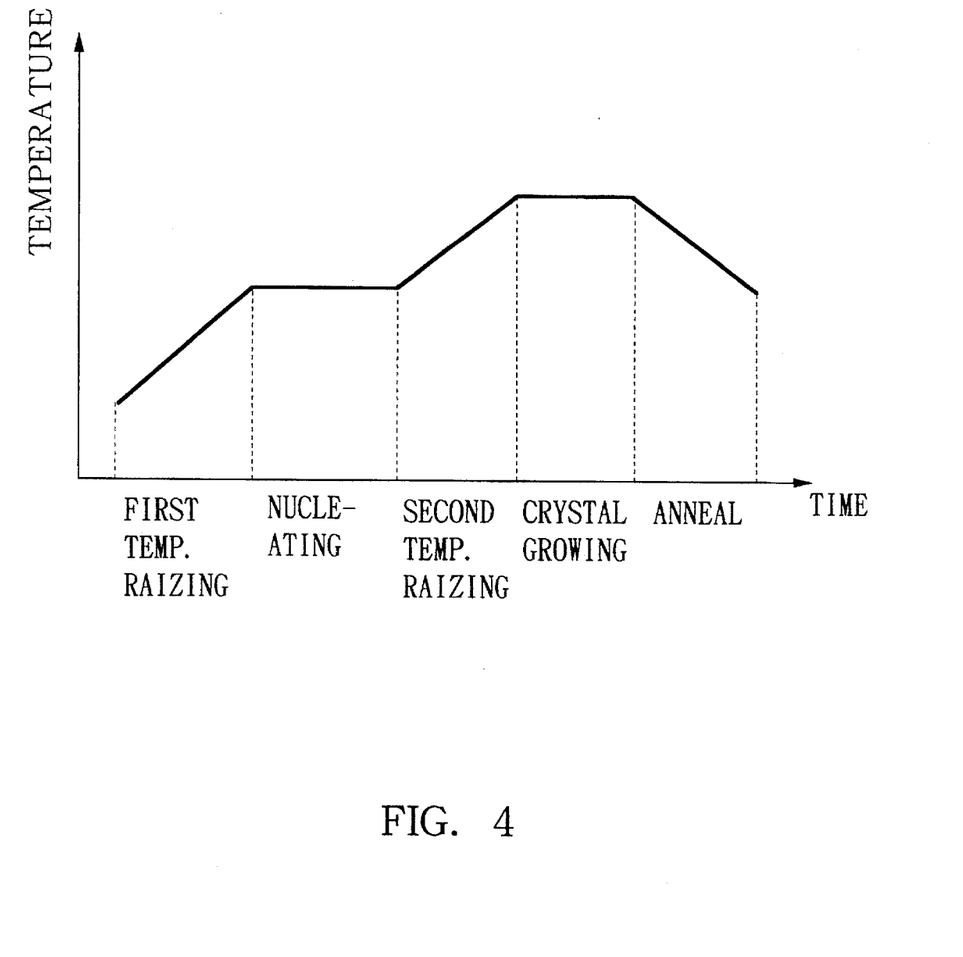
FIG. 4 is a graph showing the temperature gradient of the crystallizing device in the embodiment.

The first temperature raising zone 30 is a zone in which the temperature of the glass preform is raised to a nucleating temperature. As shown in FIG. 4, a predetermined temperature gradient is provided by this zone and the temperature of the glass preform is gradually raised as the glass preform is conveyed.

The nucleating zone 31 provided after the first temperature raising zone 30 maintains the temperature of the glass preform at a constant nucleating temperature. In this zone, a nucleus is formed in the glass preform. The nucleus is formed by adding a nucleating agent such as $P_2O_5$ or $TiO_2$ in the raw materials of the glass-ceramic.

The second temperature raising zone 32 provided after the nucleating zone 31 raises the temperature of the glass preform to a crystal growing temperature. As shown in FIG. 4, a predetermined temperature gradient for this zone is provided and the temperature of the glass preform is gradually raised as the glass preform is conveyed.

The crystal growing zone 33 provided after the second temperature raising zone 32 maintains the temperature of the glass preform at a constant crystal growing temperature to enable a crystal to grow in the glass preform.

The annealing zone 34 provided after the crystal growing zone 33 anneals the glass preform to remove residual strain from the glass-ceramic and homogenize the glass-ceramic. As shown in FIG. 4, a predetermined temperature gradient is provided for this zone and the formed glass-ceramic is gradually annealed as it is conveyed by the conveyor system 26.

In the heating oven 25, heaters 35 are provided on the outside of the muffles of the respective zones 30 to 34 in the upper, bottom and side portions thereof, so that control of temperature can be made for each of the zones deviation of plus and minus 2 C. from the set temperature. By this arrangement, the thermal processing cycle of the crystallizing process can be made accurate and crystallization of the glass preform can be made easily and accurately. As the heaters 35, a suitable heater such as SiC heater, Kanthal heater or nichrome heater can be used depending upon the crystallizing temperature. For a bottom plate used for placing the glass preform thereon in the crystallizing process, a material which is refractory and is not fused to the glass preform is selected. For this material, aluminum oxide, magnesium oxide and carbon are preferable.

In the posterior stage of the crystallizing device 20, there is provided a belt conveyor 36 for conveying the formed glass-ceramic to a polishing process in the posterior stage. Between the crystallizing device 20 and the belt conveyor 36 is provided a conveyor system 37 for automatically passing the glass-ceramic from the crystallizing device to the belt conveyor 36.

Thus, according to the embodiment, all process from melting of raw materials to crystallizing of the glass preform can be automatically carried out whereby a glass-ceramic can be produced automatically in a large scale and, moreover, the quality of the product can be stabilized and the process management can be facilitated.

Furthermore, according to this embodiment, the weight or volume of the glass preform formed by the press device 13 is measured and a difference signal corresponding to a difference between the measured value and the reference weight or volume value is fed back to the flow quantity control device 12 to correct the amount of the melted glass introduced to the press means. Accordingly, the glass preform provided by the press means can be directly crystallized by the crystallizing device 20 and an only process required after annealing of the glass-ceramic is polishing as a finishing process. Thus, the cutting process which was indispensable in the prior art process is obviated and the tremendous labor and time required in the prior art process for reducing the thickness of the glass-ceramic after crystallization also are obviated and, therefore, the manufacturing cost of the glass-ceramic can be greatly reduced.

In the above described embodiment, the apparatus includes the temperature maintaining device 21 provided over a zone between the pressing device 13 and the crystallizing device 20 for maintaining the temperature of the formed glass within a predetermined range of temperature.

In the above described embodiment, since the crystallizing device 20 comprises five zones of the first temperature raising zone 30, nucleating zone 31, second temperature raising zone 32, crystal growing zone 3 and annealing zone 34, the thermal processing cycle requried for crystallizing the glass preform can be easily realized whereby crystallizing of the glass preform can be carried out automatically and accurately.

In the above described embodiment, the pressing device 13 includes the disk 15 rotated about the rotating shaft 14 and the molds 16 arranged in the circumferential direction of the disk 15 at a predetermined angular interval and, accordingly, introduction of melted glass to the pressing device 13, forming of the melted glass and conveying of the glass preform can be made continuously by rotating the disk 15 intermittently so that the continuous forming of the glass-ceramic can be made effectively.

What is claimed is:

1. An apparatus for continuously forming and processing a glass-ceramic comprising:

melting means for melting raw materials for a glass-ceramic into a melted glass;

a flow tube for conveying the melted glass flowing out of the melting means, said flow tube having a melted glass inlet and a melted glass outlet, inclining downwardly toward the melted glass outlet and having an inner diameter which becomes smaller toward the melted glass outlet, a cross section of said melted glass inlet being larger than a cross section of said melted glass outlet;

flow quantity control means connected to said flow tube for controlling the quantity of said melted glass flowing through said flow tube;

press means provided in a posterior stage to said flow tube for pressing the melted glass from the flow tube into a predetermined form;

glass preform checking means provided for measuring the weight or volume of a glass preform provided by the pressing means and for feeding back a difference signal corresponding to a difference between the measured value of the weight or volume and a reference value of the weight or volume to the flow quantity control means, said flow quantity control means controlling the quantity of the melted glass flowing through the flow tube in response to the difference signal to reduce the difference between the measured value and the reference value; and crystallizing means provided in a posterior stage to the glass preform checking means for crystallizing the glass preform.

2. An apparauts as defined in claim 1 wherein the inner diameter of the flow tube becomes stepwisely smaller toward the melted glass outlet.

3. An apparatus as defined in claim 1 wherein the inner diameter of the flow tube becomes continuously smaller toward the melted glass outlet.

4. An apparatus as defined in claim 1 which further comprises a temperature maintaining means provided over a zone between the press means and the crystallizing means for maintaining the temperature of the glass preform within a predetermined range of temperature.

5. An apparatus as defined in claim 4 wherein said predetermined range of temperature is set in the vicinity of a glass transition temperature.

6. An apparatus as defined in claim 1 wherein said flow tube is made of platinum or a platinum alloy and consists of plural sections, amounts of platinum used for the respective sections differing from one another thereby providing electric resistance which differs from one another among said sections and said flow quantity control means comprises plural electrical circuits each being allotted to one of said sections of said flow tube to heat the allotted section individually and independently from the other section in response to the difference signal to control viscosity of the melted glass and thereby control the flow quantity of the melted glass.

* * * * *